UNITED STATES PATENT OFFICE.

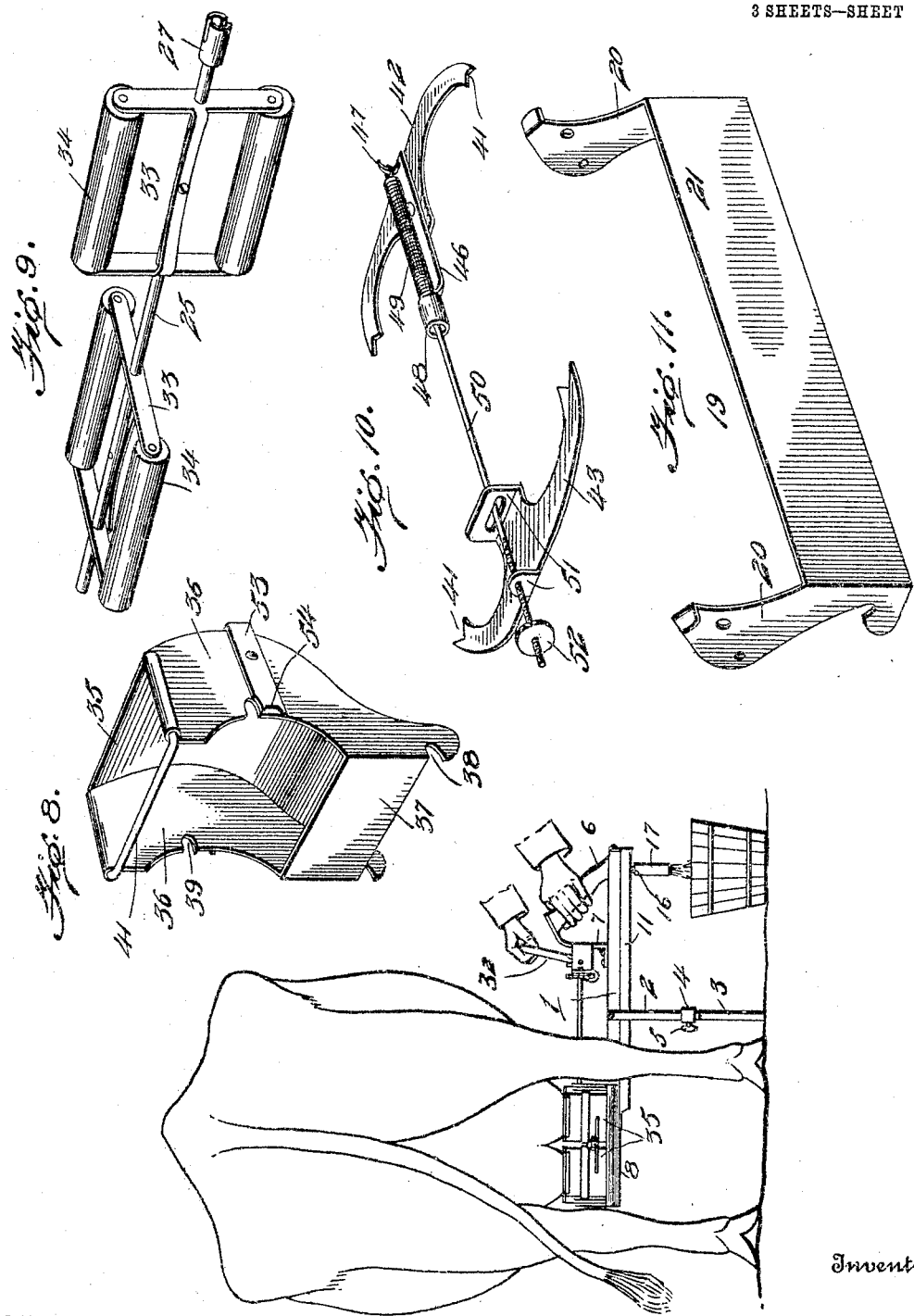

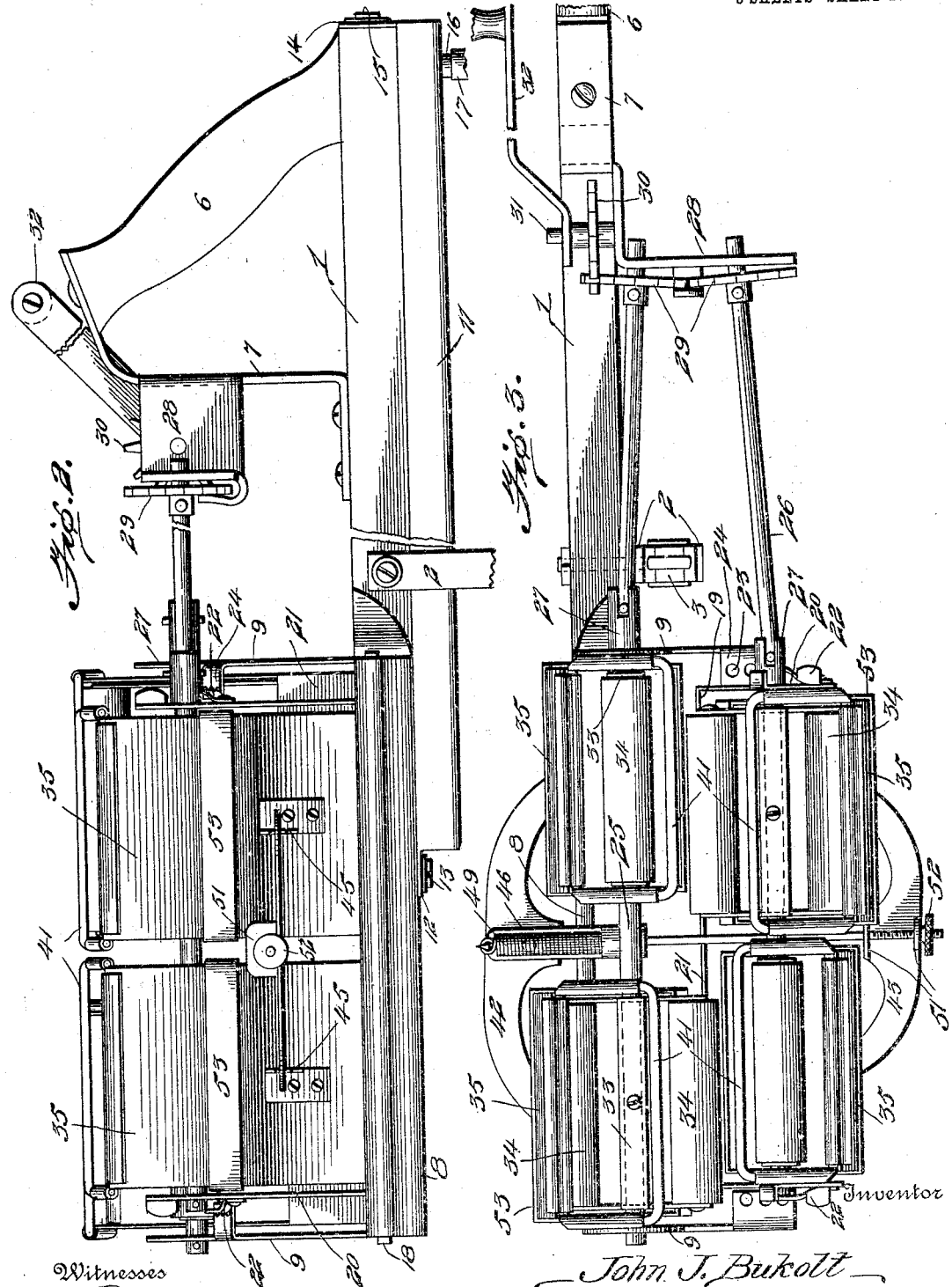

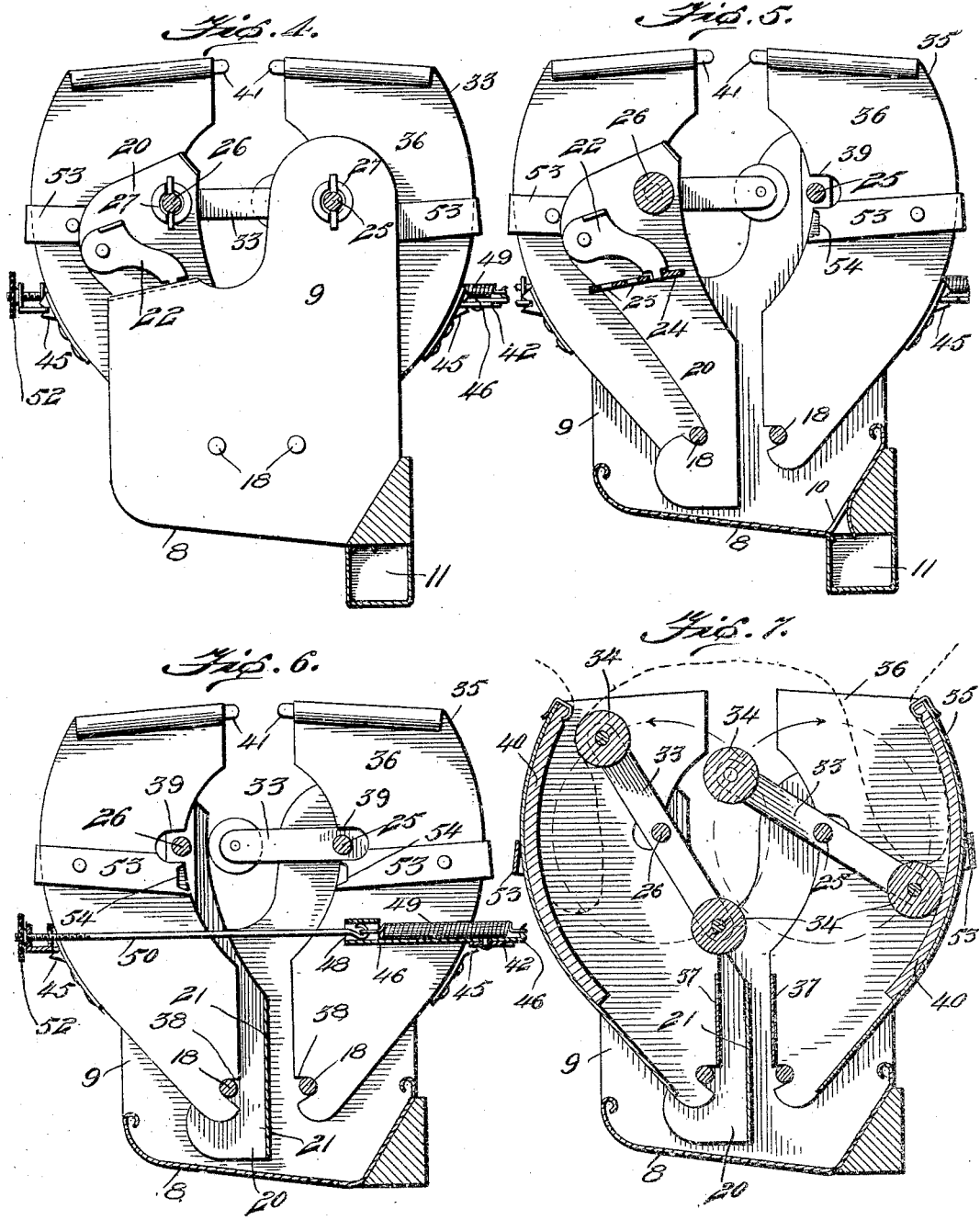

JOHN JOSEPH BUKOLT, OF STEVENS POINT, WISCONSIN.

MILKING-MACHINE.

958,954.  Specification of Letters Patent.  Patented May 24, 1910.

Application filed August 30, 1909. Serial No. 515,209.

*To all whom it may concern:*

Be it known that I, JOHN JOSEPH BUKOLT, a citizen of the United States, residing at Stevens Point, in the county of Portage and State of Wisconsin, have invented certain new and useful Improvements in Milking-Machines; and I do declare the following to be a full, clear, and exact description of the invention, such as will enable others skilled in the art to which it appertains to make and use the same.

This invention relates to improvements in milking machines.

One object of the invention is to provide an improved construction of milking machine having means whereby all four teats may be milked at the same time, without injury or inconvenience to the cows.

Another object is to provide a milking machine which may be adjusted for long or short teats and in which the teat cups may be moved a greater or less distance apart.

A further object is to provide means whereby the udder will be manipulated during the milking operation.

With the foregoing and other objects in view, the invention consists of certain novel features of construction, combination and arrangement of parts, as will be more fully described and particularly pointed out in the appended claims.

In the accompanying drawings, Figure 1 is a view, partly in section, showing the application of the invention; Fig. 2 is a side elevation of the device; Fig. 3 is a top plan view; Figs. 4 and 5 are vertical transverse sections taken on different planes through the device; Fig. 6 is a similar view taken between the two sets of teat cups on the line with the tension mechanism of the cups; Fig. 7 is a similar view taken through the milking rollers, showing in dotted lines a portion of an udder and two teats to illustrate the manner in which the milking rollers on the opposite sides of the machine are engaged with the teats; Fig. 8 is a perspective view of one of the teat cups, showing the means whereby the same is adjusted nearer to or farther from the milking rollers; Fig. 9 is a detail perspective view of the milking rollers and their operating shaft on one side of the machine, showing the relative position of one pair of rollers on the shaft with respect to the other pair; Fig. 10 is a detail perspective view of the pressure regulating mechanism of the teat cups; Fig. 11 is a detail perspective view of the adjustable supporting frame for one side of the machine.

Referring more particularly to the drawings, 1 denotes a supporting bar, to which is pivotally connected at a suitable point an adjustable supporting leg, said leg preferably consisting of an upper portion comprising flat metal bars 2 which are connected at their upper ends to the bar 1 by a pivot bolt, as shown. Between the bars 2 is slidably mounted the adjustable lower portion of the leg, which preferably consists of a wooden bar 3. Around the lower ends of the bars 2 and the wooden bar 3, is arranged a collar 4 which is held in position by the upwardly bent lower end of one of the bars 2 and in which is arranged a set screw 5 which, when screwed inwardly, firmly clamps the bars 2 against the bar 3, thereby holding the latter in its adjusted positions to support the machine at the desired elevation. On the outer end of the bar 1 is arranged a suitable handle 6, the upper end of which is secured to the bar 1 by a brace 7. On the outer portion of the bar 1, is secured a milk tray 8, the opposite ends of which project upwardly and form bearing members 9 for one of the operating shafts of the machine. In the bottom of the tray, near its inner end, is formed a discharge passage 10, through which the milk passes to a discharge trough 11 secured to the underside of the supporting bar and extending to the handle end of the same as shown. The trough 11 is attached to the bar 1 at its inner end by a lip 12, which is engaged with a loop or staple 13 secured to the underside of the bar 1 and at its opposite end the trough is provided with an upwardly projecting spring attaching plate 14 having formed therein an aperture which is adapted to be engaged with a pin or stud 15 projecting from the adjacent end of the supporting bar 1. By thus attaching the trough, the same may be readily disconnected and removed from the machine for cleaning. In the bottom of the trough, adjacent to its outer end, is formed a discharge spout 16 with which is adapted to be connected a milk discharging tube 17 which may be connected with a pail or other suitable receptacle.

Secured at their opposite ends in the end pieces 9 of the tray 8 are parallel teat cup supporting rods 18 which extend from one end to the other of the tray, as shown. To one of the rods 18 is pivotally and detachably connected the lower end of an adjustable supporting frame 19 comprising end plates 20 which are connected together at their inner edges and adjacent to their lower ends by a longitudinally disposed plate 21 which extends through the tray between the teat cups, as shown. To the outer sides of the plates 20 of the supporting frame, adjacent to their upper ends are pivotally connected adjusting pawls 22, which are adapted to be engaged with one of a series of apertures 23 formed in horizontally disposed adjusting plates 24 which are preferably formed by inwardly bent right-angularly projecting portions of the end plates 9 of the tray 8. By thus arranging and connecting the supporting frame 9, the latter may be moved inwardly or outwardly toward or from the center of the machine, thereby diminishing or increasing the distance between the teat cups to facilitate the application of the machine to udders having teats at different distances apart.

In the end plates 9 of the tray 8, is revolubly mounted one of the operating shafts 25 of the milking rollers of one side of the machine, while in the plates 20 of the adjustable supporting frame 19, is revolubly mounted the other operating shaft 26 for the milking rollers for the opposite side of the machine. The shafts 25 and 26 are formed in inner and outer sections, said sections being connected together adjacent to the body portion of the machine by universal joints 27. The inner ends of the shafts 25 and 26 are mounted in a bearing bracket 28 secured to the handle brace 7, as shown. On the shafts 25 and 26, adjacent to the bracket 28, are fixedly mounted intermeshing operating gears 29, with one of which is engaged a drive gear 30, revolubly mounted on a stub shaft 31 projecting from the bearing bracket 28 at substantially right angles to the shafts 25 and 26. The drive gear 30 is provided with an extended hub with which is fixedly connected an operating handle or crank 32 whereby motion is imparted through the gears 29 and 30 to the operating shafts of the milking rollers.

The outer portions of the operating shafts are rigidly secured to milking roller frames 33, the frames of each shaft being arranged at substantially right angles to each other, and the adjacent frames on the opposite shafts are preferably disposed at substantially right angles to each other, when in operation. In the outer ends of the frames 33 are revolubly mounted milking rollers 34 which are formed of rubber or other suitable material of a resilient or elastic nature. Pivotally and detachably engaged with the rods 18 in the trays 8 are teat cups 35, one of which is in position to be engaged by each pair of milking rollers on the shafts 25 and 26. The cups 35 comprise outer side pieces, which are preferably curved, as shown, and end pieces 36, the lower portions of the inner edges of which are connected together by milk deflecting plates 37. In the lower ends of the end pieces 36 of the cups 35 are formed notches 38 which are adapted to be engaged with the rods 18 whereby the cups are detachably supported. In the inner edges of the end pieces 36 are formed notches 39 through which the shafts 25 and 26 extend. The milking rollers are secured on the shafts 25 and 26 in position to engage their respective cups, as shown. The curved outer side pieces of the cups 35 are provided with a lining 40 of soft resilient material which is preferably in the form of sponge rubber. Across the inner edges of the upper ends of the cups are arranged guard rods 41 which prevent the teats from tangling between the rollers or getting pinched.

The teat cups 35 are yieldingly held in position to be engaged by the milking rollers by means of a tension or pressure regulating mechanism, consisting of cup engaging plates 42 and 43 which are arranged on opposite sides of the machine, adjacent to the outer portions of the cups. The ends of the plates 42 and 43 curve inwardly and are provided with notches 44 which are adapted to be engaged with notched lugs 45, secured to the curved outer sides of the cups, as shown. On the plate 42 is secured a spring attaching guide member 46, on the outer end of which is formed a spring engaging hook 47, while on the inner end of which is formed a guide tube 48. With the hook 47, is engaged one end of a tension or pressure spring 49, the opposite end of which projects into the tube 48 and has connected thereto an adjusting rod 50, having a threaded outer end which projects through guide lugs 51 on the opposite cup engaging plates 43 and on said threaded end is screwed an adjusting nut 52, whereby the tension of the spring may be regulated, thus holding the cups 35 with greater or less resistance against the pressure of the milking rollers. By means of the pressure regulating mechanism for the teat cups 35, the machine may be adjusted or regulated for hard or easy milking cows. The pressure regulating mechanism also serves to retract or draw the cups 35 inwardly after each engagement therewith of the milking rollers 34, which movement of the cups serves to manipulate the udder, thereby greatly facilitating the milking operation.

In order to facilitate the use of the machine on cows having long or short teats, I provide a cup adjusting mechanism, whereby the teat cups are held at a greater or less distance from the milking rollers. The mechanism for thus adjusting the cups comprises a bail-shaped frame 53 which is engaged with the outer side and ends of the cups and has its ends pivotally connected to the ends of the cups, as shown. In the outer ends of the end portions of the frame 53 are formed notches 54 which, when the outer portions of the frames are swung downwardly and the inner ends upwardly, said notched ends will be brought into position to engage the operating shafts 25 of the milking rollers and will thereby hold the cups back from the shafts so that the rollers will engage the cushioned lining of the cups farther down when the adjusting frame is in an inoperative position and the cups closer to the shafts. Thus when the machine is used with cows having short teats the adjusting frames are released to permit the cups to move in closely to the shafts so that the milking rollers will engage the cups at their highest points, while, when the machine is used with cows having long teats, the frame is adjusted to engage the operating shafts, thus holding the cups back so that the rollers are engaged therewith farther down, thereby permitting the lower rollers to let go or leave the teats before the upper rollers engage the same, thus allowing the teats to refill.

It will be seen from the drawings, that the two cups on the right side of the machine are farther apart than the two cups on the left side. The cups are thus arranged to permit the machine to be constructed as narrow as possible on the left side to facilitate the insertion of this portion of the machine, between the hind legs of the cow, so that the back pair of teats may be readily reached by the left side cups and rollers of the machine.

By detachably connecting the teat cups and supporting frame 19 with the supporting rods 18 in the milk tray, said cups and frame may be readily removed and access to all parts of the machine may then be had to facilitate the thorough cleansing of the same.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention, as defined in the appended claims.

Having thus described my invention, what I claim is:

1. In a milking machine, a supporting bar, a milk receiving tray secured to said bar, a supporting frame adjustably mounted in said tray, operating shafts mounted in said tray and frame, milking rollers arranged on said shafts, and teat cups adapted to coöperate with said rollers in the milking operation.

2. In a milking machine, a supporting bar, a milk receiving tray arranged on said bar, a bearing frame adjustably mounted in said tray, roller operating shafts mounted in said tray and frame, an operating mechanism connected to said shafts, pairs of milking rollers arranged at right angles on said shafts, teat cups pivotally and detachably mounted in said trays, and adapted to coöperate with said milking rollers during the milking operation, and an adjustable pressure mechanism adapted to yieldingly hold said cups against the pressure of said milking rollers and to draw the cups inwardly when disengaged by the rollers to manipulate the udder.

3. In a milking machine, a supporting bar, a milk receiving tray arranged on said bar, a bearing frame adjustably mounted in said tray, roller operating shafts mounted in said tray and frame, an operating mechanism connected to said shafts, pairs of milking rollers arranged at right angles on said shafts, teat cups pivotally and detachably mounted in said trays and adapted to coöperate with said milking rollers during the milking operation, an adjustable pressure mechanism adapted to yieldingly hold said cups against the pressure of said milking rollers and to draw the cups inwardly when disengaged by the rollers, to manipulate the udder, and means to adjust said cups whereby the machine may be used in connection with long or short teats.

4. In a milking machine, a supporting bar, a tray secured to said bar, said tray having formed thereon upwardly projecting end plates, supporting rods arranged in said tray and secured to said end plates, an adjusting frame pivotally and detachably engaged with one of said rods, pawls arranged on said frames to hold the same in adjusted position, operating shafts revolubly mounted in said end plates and frame, pairs of milking rollers arranged on each of said shafts, said pairs of rollers being disposed at right angles to each other, teat cups pivotally and detachably secured to said rods and adapted to coöperate with said milking rollers, a soft resilient lining arranged in said cups, a guard rod arranged across the upper ends of the cups, a yielding pressure applying mechanism engaged with said cups, said mechanism comprising pairs of cup engaging plates, a spring connection to secure said plates into yielding engagement with the cups, means to regulate the tension of said spring connection whereby a greater or less amount of resistance is provided for the cups with respect to the milking rollers, whereby the machine may be adapted for hard or easy milking cows, and means to facilitate the use of the machine in connection with long or short teats.

5. In a milking machine, a supporting mechanism, a milk receiving tray arranged thereon, a pair of suitably mounted operating shafts, means whereby one of said shafts is adjusted toward or from the other shaft, milking rollers arranged on said shafts, teat cups removably secured in said tray, milk deflecting plates arranged on said cups, means to yieldingly hold said cups in position to coöperate with said rollers, for milking purposes, an adjusting frame pivotally mounted on each of said cups and adapted to be swung into engagement with said shafts, whereby the cups are held at a greater distance from said rollers, thereby causing the latter to operatively engage the teats lower down than when the cups are closer to the rollers thus facilitating the machine for operation with long or short teats, and means whereby said rollers are operated.

6. In a milking machine, a supporting mechanism, a milk receiving tray arranged thereon, suitably mounted operating shafts, said shafts being formed in sections, universal joint connections between said sections, connecting operating gears mounted on one end of said shafts, a drive gear engaged with one of said operating gears, an operating handle connected to said drive gear, whereby motion is imparted through said gears to said shafts, milking rollers arranged on said shafts, teat cups mounted in said tray, and means whereby said cups are yieldingly held in position to coöperate with said rollers for milking purposes.

7. In a milking machine, a supporting bar, a milk-receiving tray arranged thereon, a bearing frame adjustably mounted in said tray, roller-operating shafts mounted in in said tray and frame, an operating mechanism connected to said shafts, pairs of milking rollers arranged at right angles on said shafts and teat cups pivotally and detachably mounted in said trays and coöperating with said milking rollers during the milking operation.

8. In a milking machine, a supporting bar, a milk-receiving tray thereon, a bearing frame adjustably mounted in said tray, roller-operating shafts mounted in said tray and frame, an operating mechanism connected to said shafts, pairs of milking rollers arranged at right angles on said shafts, teat cups pivotally and detachably mounted in said trays and coöperating with said milking rollers during the milking operation, and means to adjust said cups, whereby the machine may be used in connection with long or short teats.

In testimony whereof I have hereunto set my hand in presence of two subscribing witnesses.

JOHN JOSEPH BUKOLT.

Witnesses:
T. L. N. PORT,
A. F. GRANT.